US012798770B2

(12) United States Patent
Maldonado

(10) Patent No.: US 12,798,770 B2
(45) Date of Patent: Nov. 17, 2026

(54) AIRCRAFT WITH DUCTED PROPULSION

(71) Applicant: Texas Tech University System, Lubbock, TX (US)

(72) Inventor: Victor Maldonado, Lubbock, TX (US)

( * ) Notice: Subject to any disclaimer, the term of this patent is extended or adjusted under 35 U.S.C. 154(b) by 0 days.

(21) Appl. No.: 19/119,348

(22) PCT Filed: Oct. 20, 2023

(86) PCT No.: PCT/US2023/035590

§ 371 (c)(1),
(2) Date: Apr. 8, 2025

(87) PCT Pub. No.: WO2024/086324

PCT Pub. Date: Apr. 25, 2024

(65) Prior Publication Data

US 2026/0131887 A1 May 14, 2026

Related U.S. Application Data

(60) Provisional application No. 63/418,458, filed on Oct. 21, 2022.

(51) Int. Cl.
*B64C 29/00* (2006.01)
*B64C 3/14* (2006.01)
(Continued)

(52) U.S. Cl.
CPC ............ *B64C 29/0033* (2013.01); *B64C 3/14* (2013.01); *B64C 9/00* (2013.01); *B64C 27/463* (2013.01);
(Continued)

(58) Field of Classification Search
CPC ............ B64C 29/0008; B64C 29/0016; B64C 29/0033; B64C 29/00; B64C 3/10;
(Continued)

(56) References Cited

U.S. PATENT DOCUMENTS 1,909,186 A * 5/1933 Lougheed ................ B64C 3/14 244/214
4,403,755 A 9/1983 Gutsche
(Continued)

FOREIGN PATENT DOCUMENTS

CN 114802735 A * 7/2022 ............ B64C 27/28
EP 3998687 A1 5/2022
(Continued)

OTHER PUBLICATIONS

International Search Report and Written Opinion, International Patent Application No. PCT/US2023/035590, Feb. 7, 2024, 9 pgs.
(Continued)

*Primary Examiner* — Ashesh Dangol
(74) *Attorney, Agent, or Firm* — LOZA & LOZA, LLP; Kevin L. Soules

(57) ABSTRACT

The disclosed embodiments are directed to an eVTOL aircraft comprising a fuselage, wings mounted to the fuselage, where the wings comprise an undercambered lower surface, and an array of ducted fans mounted to the undercambered lower surface, wherein each fan in the array of ducted fans further comprises a duct and a plurality of rotor blades, each of the plurality of rotor blades comprising a zero sweep leading edge and an elliptical trailing edge.

17 Claims, 11 Drawing Sheets

(51) Int. Cl.

| | |
|---|---|
| ***B64C 9/00*** | (2006.01) |
| ***B64C 27/46*** | (2006.01) |
| ***B64C 27/467*** | (2006.01) |
| ***B64D 27/31*** | (2024.01) |
| ***B64D 27/34*** | (2024.01) |
| ***B64D 27/40*** | (2024.01) |

(52) U.S. Cl.
CPC ............ *B64C 27/467* (2013.01); *B64D 27/31* (2024.01); *B64D 27/34* (2024.01); *B64D 27/40* (2024.01); *B64C 2003/142* (2013.01)

(58) Field of Classification Search
CPC ....... B64C 3/14; B64C 27/467; B64C 27/463; B64D 27/34; B64D 27/31; B64D 27/40
See application file for complete search history.

(56) References Cited

U.S. PATENT DOCUMENTS

| | | | | |
|---|---|---|---|---|
| 4,801,058 | A | 1/1989 | Mullins | |
| 2011/0062278 | A1 | 3/2011 | Ulrich et al. | |
| 2019/0291863 | A1 | 9/2019 | Lyasoff et al. | |
| 2020/0284268 | A1 | 9/2020 | Haaf et al. | |
| 2021/0139133 | A1* | 5/2021 | Seeley .................... | B64C 11/16 |
| 2021/0316848 | A1 | 10/2021 | Stukas | |
| 2022/0063793 | A1 | 3/2022 | Freely et al. | |
| 2022/0234745 | A1 | 7/2022 | Abramov et al. | |

FOREIGN PATENT DOCUMENTS

| | | | |
|---|---|---|---|
| GB | 2064005 | A | 6/1981 |
| RU | 2752104 | C1 | 7/2021 |

OTHER PUBLICATIONS

Santacruz; "Low-Tip-Speed High-Torque Proprotor Noise Approximation for Design Cycle Analysis"; Doctoral Dissertations and Master's Theses; Embry-Riddle Aeronautical University; https://commons.erau.edu/edt/451; 2019; 166 pgs.

Gritantini; "Micro-vehicle Imitates the Winged Maple Seed"; MIT Technology Review; https://www.technologyreview.com/2009/10/26/208589/micro-vehicle-imitates-the-winged-maple-seed-2/; Oct. 26, 2009.

BBC News; "From flying saucers to vacuum-sealed trains"; http://news.bbc.co.uk/2/hi/in_pictures/4805420.stm; Mar. 14, 2006.

Weitsman et al.; "Parametric Study of eVTOL Rotor Acoustic Design Trades"; AIAA Scitech 2021 Forum; https://arc.aiaa.org/doi/abs/10.2514/6.2021-1987; Jan. 4, 2021.

Basset et al.; "Models and Methods at ONERA for the Presizing of eVTOL Hybrid Aircraft Including Analysis of Failure Scenarios"; AHS Forum 2018; Feb. 13, 2019; 16 pgs.

Yu et al.; "Aero-propulsive Integration Effects of an Overwing Distributed Electric Propulsion System"; AIAA Scitech 2021 Forum; https://arc.aiaa.org/doi/abs/10.2514/6.2021-0604; Jan. 4, 2021.

* cited by examiner

AIRCRAFT WITH DUCTED PROPULSION

CROSS REFERENCE TO RELATED PATENT APPLICATIONS

The present application claims the priority and benefit under 35 U.S.C. § 119(e) of U.S. Provisional Patent Application Ser. No. 63/418,458, filed Oct. 21, 2022, entitled "RECONFIGURABLE UNMANNED VEHICLES." U.S. Provisional Patent Application Ser. No. 63/418,458 is herein incorporated by reference in its entirety.

TECHNICAL FIELD

Embodiments are generally related to aerial vehicles. Embodiments are further related to components associated with aerial vehicles. Embodiments are further related to electric powered aerial vehicles capable of vertical takeoff and landing for point-to-point passenger flight. Embodiments are further related to underwing ducted fans for aerial vehicles. Embodiments are also related to undercamber airfoils for aerial vehicles. Embodiments are also related to propulsive ducted fan rotors with specially shaped blades.

BACKGROUND

With the advent of aerial vehicles powered by electricity, technology is converging on the science fictional vision of flying cars. One likely candidate for making this dream a reality is the electric vertical takeoff and landing concept (e-VTOL). E-VTOLs have emerged as a frontrunner in the race to offer point-to-point passenger flight in congested cities due to the maturation of key technology, particularly, efficient high power density electric motors coupled with safe lithium polymer batteries with increasing energy densities. E-VTOLs are thus an emerging class of aircraft poised to revolutionize the advanced air mobility (AAM) market and short-route urban transportation.

These aircraft are envisioned to offer on-demand air taxi services, akin to ground ride share services such as Uber®. According to leading eVTOL developers and stakeholders, the main technical barriers to the market adoption of eVTOLs is reducing propulsion related noise and improving efficiency, which creates a limitation on the range and thus metro-centered missions that can be carried out by E-VTOLs.

A wide variety of e-VTOL configurations have been proposed, each with perceived mission and operational advantages. In general, these vehicles must offer safety, reliability, and efficiency, with low noise pollution as compared to conventional forms of air travel. There are several e-VTOL aircraft that are currently undergoing flight testing and certification. These aircraft employ a distributed propeller or open rotor propulsion architecture. Large propellers that operate at lower speeds offer a higher aerodynamic efficiency as compared to ducted fans or propellers which are generally smaller and must operate at higher speed. However, eVTOLs with a series of open rotors on the main wing suffer from complex flow interactions between the rotor downwash and the wing/body, which are a source of noise and unsteady aerodynamics.

Distributed ducted fans are considered safer for passengers (due to ducting of the fan) and mitigate the unsteady flow and aerodynamic interaction between the ducted fan jet and aircraft wing/body.

Studies on ducted fans have shown that the shape of the duct and rotor blade have a strong influence on the aerodynamics and acoustics of the propulsion system. Nevertheless, most ducted fan blades are rectangular planform blades. These types of blades are unacceptably noisy and do not provide optimal thrust for E-VTOLs.

As such, there is a need in the art for improved airfoils for ducted fan E-VTOLs as well as improved blade shape for ducted fan rotors as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide an aerial vehicle.

It is another aspect of the disclosed embodiments to provide systems and apparatuses for E-VTOLs.

It is another aspect of the disclosed embodiments to provide methods and systems for underwing ducted fans for aerial vehicles.

It is another aspect of the disclosed embodiments to provide methods, systems, and apparatuses relating to undercamber airfoils for aerial vehicles.

It is another aspect of the disclosed embodiments to provide to propulsive ducted fan rotors with specially shaped blades.

It will be appreciated that the methods and systems can be achieved according to the embodiments disclosed herein. For example, the disclosed embodiments are directed to an eVTOL aircraft comprising a fuselage, wings mounted to the fuselage, where the wings comprise an undercambered lower surface, and an array of ducted fans mounted to the undercambered lower surface, wherein each fan in the array of ducted fans further comprises a duct and a plurality of rotor blades, each of the plurality of rotor blades comprising a zero sweep leading edge and an elliptical trailing edge.

In an embodiment, a flying system comprises a fuselage, at least one wing mounted to the fuselage, the wing comprising an undercambered lower surface, and at least one array of ducted fans mounted to the undercambered lower surface of the at least one wing. In an embodiment, the at least one wing further comprises two wings. In an embodiment, the at least one wing further comprises an airfoil comprising a Maldonado hicks airfoil. In an embodiment, the at least one array of ducted fans further comprises an inner ducted fan array configured nearer to the fuselage and an outer ducted fan array configured nearer to the at least one wing's tip. In an embodiment, the flying system further comprises a wing flap, wherein the at least one array of ducted fans is mounted on the wing flap. In an embodiment, the wing flap is configured to rotate the orientation of the array of ducted fans 90 degrees from a substantially horizontal position to a substantially vertical position. In an embodiment, the at least one array of ducted fans is mounted on an aft region of the at least one wing. In an embodiment, the at least one array of ducted fans further comprises a larger ducted fan array. In an embodiment, the flying system further comprises a linkage configured in the at least one wing, the linkage configured to move the larger ducted fan array from the front of the at least one wing to the aft of the at least one wing. In an embodiment, the larger ducted fan array is configured to be in a substantially vertical orientation in the front of the at least one wing, and a substantially horizontal orientation at the aft of the at least one wing. In an embodiment, the flying system further comprises a rotor blade associated with at least one fan in the ducted fan array, the rotor blade comprising a zero sweep leading edge and an elliptical trailing edge.

In another embodiment, a system comprises a fuselage, two wings mounted to the fuselage, and at least one ducted fan mounted to the at least one wing, the ducted fan comprising: a duct and a plurality of rotor blades, each of the plurality of rotor blades comprising: a zero sweep leading edge and an elliptical trailing edge. In an embodiment, each of the plurality of rotor blades further comprise a flat tip in spaced relation with the duct. In an embodiment, each of the plurality of rotor blades further comprises a blade root attached to a hub, where in the pitch angle of each of the plurality of blades is defined by the pitch angle of the blade root on the hub. In an embodiment, each of the two wings further comprise an undercambered lower surface. In an embodiment, each of the two wing further comprises an airfoil comprising a Maldonado-Hicks airfoil. In an embodiment the system further comprises a wing flap, wherein the ducted fan is mounted on the wing flap. In an embodiment, the wing flap is configured to rotate the orientation of the ducted fan 90 degrees from a substantially horizontal position to a substantially vertical position. In an embodiment, the ducted fan comprises an array of ducted fans, the array of ducted fans further comprising: a larger ducted fan array, an outer ducted fan array configured nearer to the at least one wing tip, and an inner ducted fan array configured between the larger ducted fan array and the outer ducted fan array.

In another embodiment an eVTOL aircraft comprises a fuselage, two wings mounted to the fuselage, the wings comprising an undercambered lower surface, an array of ducted fans mounted to the undercambered lower surface of each of the two wings, wherein each fan in the array of ducted fans comprises: a duct and a plurality of rotor blades, each of the plurality of rotor blades comprising: a zero sweep leading edge and an elliptical trailing edge.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
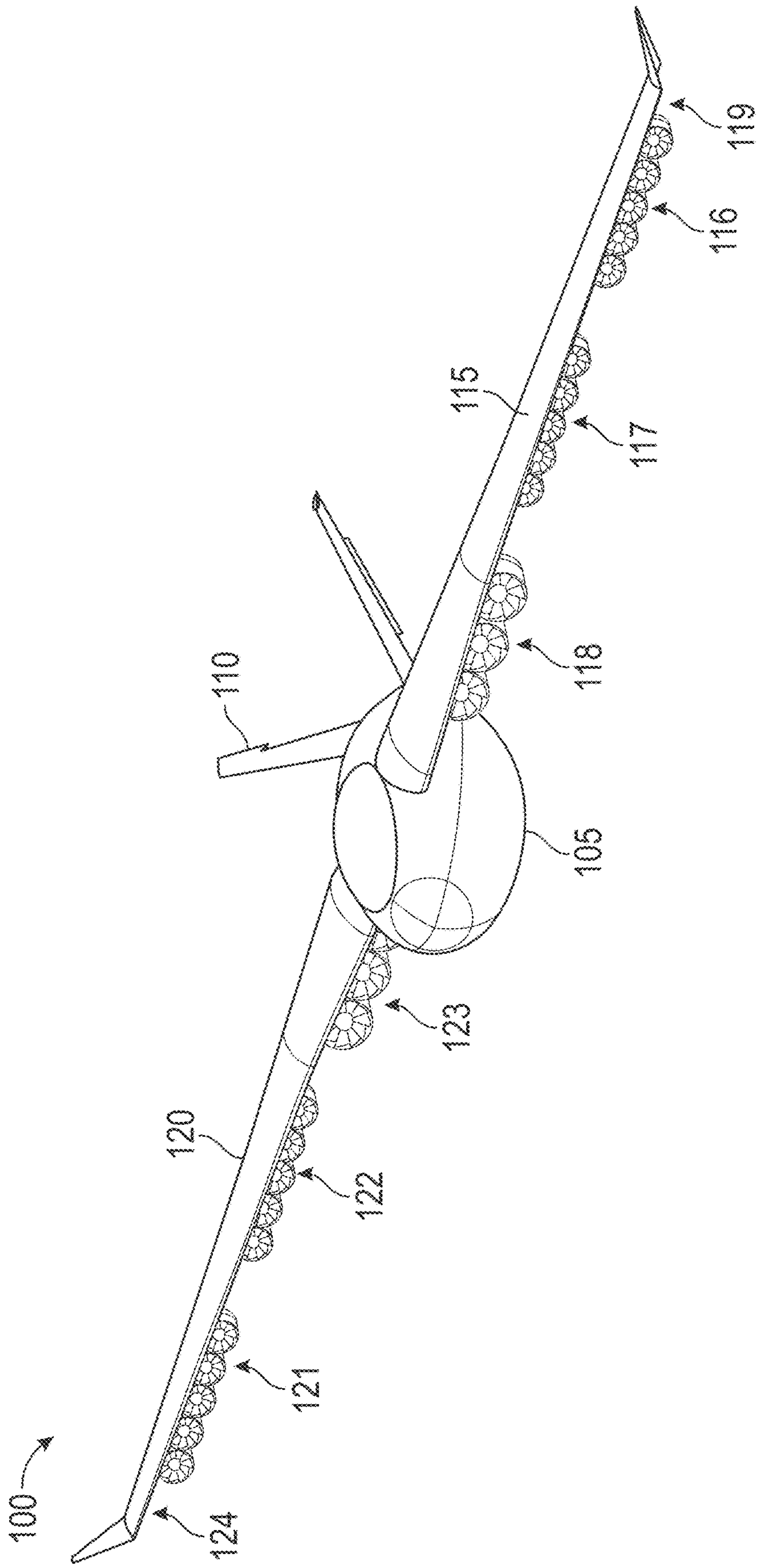
FIG. 1 depicts an aircraft, in accordance with the disclosed embodiments.

Embodiments and aspects of the disclosed technology are presented herein. The particular embodiments and configurations discussed in the following non-limiting examples can be varied, and are provided to illustrate one or more embodiments, and are not intended to limit the scope thereof.

Reference to the accompanying drawings, in which illustrative embodiments are shown, are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

The embodiments disclosed herein are directed to advanced airfoil designs, along with ducted fan propulsion integrated into an airfoil. The embodiments further include rotor blades selected with a shape to reduce noise and improve efficiency. Some or all aspects of the disclosed embodiments can be incorporated into the same or multiple embodiments, without departing from the scope disclosed herein.

An advantage of the ducted fans disclosed herein, when mounted next to a surface, is that the inflow ingests the developing boundary layer, thereby reducing the viscous drag generated over that surface.

Boundary layer ingestion (BLI) is a process in which the boundary layer flow along the surfaces of an aircraft is ingested along with the freestream airflow by the aircraft's propulsion system. As described herein, the duct or nacelle of a propulsion system is blended into either the lifting surface or fuselage surface of an aircraft. This causes the boundary layer airflow along the craft's surface to be ingested by the propulsion system's intake. This flow, which is normally associated with surface drag in traditional aircraft designs, is accelerated by the craft's propulsion system, adding energy into the flow, and reducing surface, wake, and jet dissipation. These dissipation reductions significantly reduce drag across the aircraft's mission, meaning that less energy is required to obtain the same thrust as traditional propulsion systems. Incorporating BLI into an aircraft design can result in increased flight efficiency and mission endurance, which is advantageous for eVTOL aircraft, as it provides the necessary improvements to reduce battery energy needs.

FIG. 1 illustrates an exemplary embodiment of an eVTOL system 100. The system 100 includes a specially shaped airfoil with distributed ducted fan propulsion. The system 100 can comprise a fuselage 105, tail 110, wing 115, and wing 120. The wing 115 is fitted with an outer ducted fan array 116, an inner ducted fan array 117, and a large, ducted fan array 118 which can be mounted to, or otherwise configured on the underside 119 wing 115. Likewise, wing 120 is fitted with an outer ducted fan array 121, an inner ducted fan array 122, and a large, ducted fan array 123 which can be mounted to, or otherwise configured on the underside 124 wing 123. It should be appreciated that each of the respective fan arrays can comprise one or more fans.

Each of the inner and outer ducted fan arrays 116, 117, 121, and 122 can be mounted underneath the respective wing in the aft region. In an embodiment, the ducted fan arrays can be mounted underneath the wing such that the inlet of the fans are positioned near the trailing edge at nominally, x/c=0.6 of the respective wings 115 and 120. Both wings 115 and 120 can further comprise a specially designed airfoil as further detailed herein, which may be referred to as a "Maldonado-Hicks" airfoil 200.

The Maldonado-Hicks airfoil can serve two unique purposes. First, the airfoil is undercambered to intentionally, partially hide the ducted fan arrays 116, 117, and 118, and ducted fan arrays 121, 122, 123, when looking at the aircraft 100 from the front in elevation, thereby reducing the frontal cross-section wing area and its form drag.

In addition, the Maldonado-Hicks airfoil serves as a pre-inlet for the fans by gradually expanding the flow and reducing inflow distortion into the duct inlet and fan. Integration or blending of the airfoil with the ducted fan is further disclosed in order to optimize boundary layer ingestion. FIG. 6D provides flow streamlines 620 showing how the flow expands and slows down due to the increase in area at the inlet 625 of the ducted fan.

Figure 2:
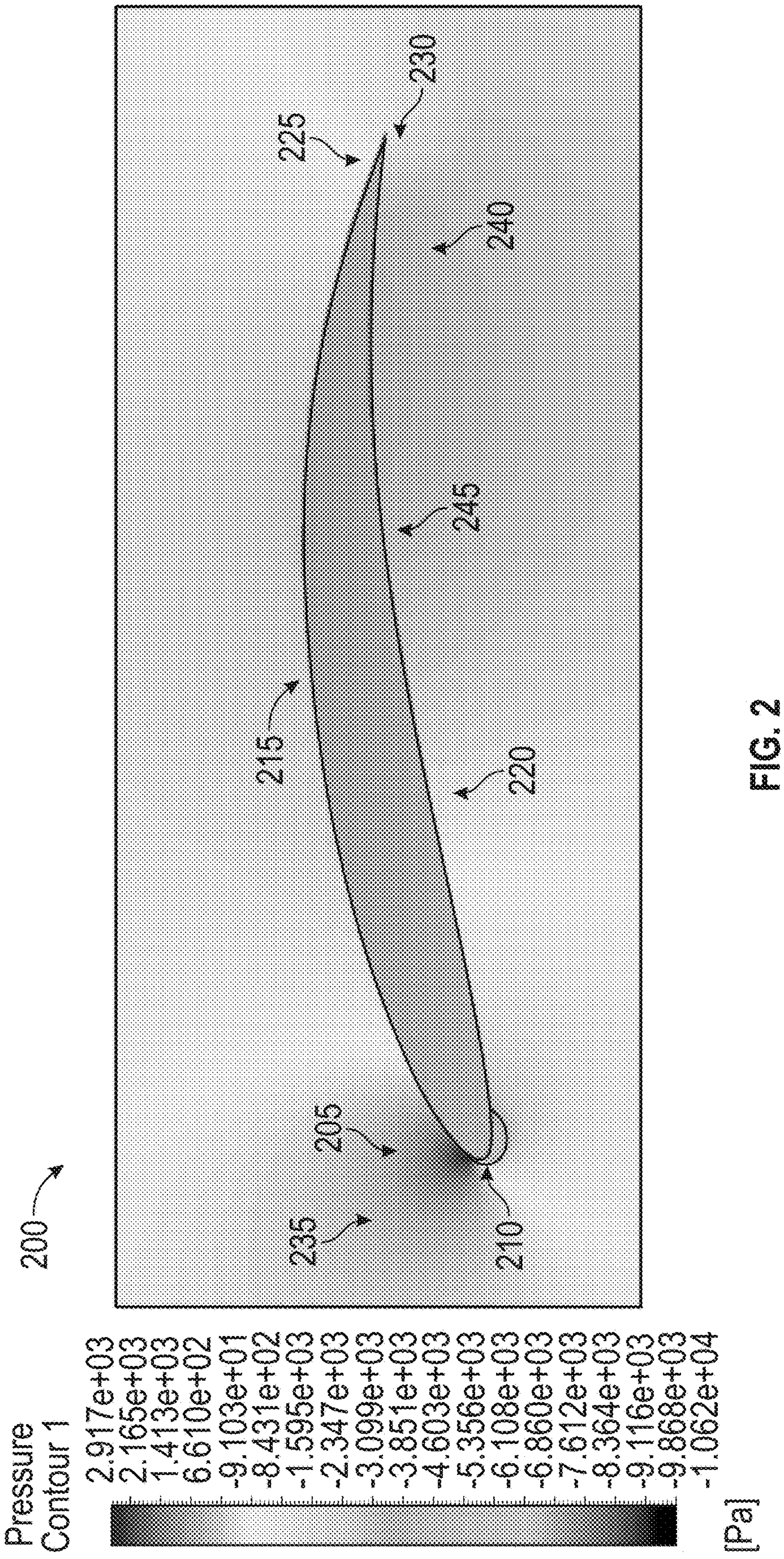
FIG. 2 depicts aspects of an aircraft airfoil, in accordance with the disclosed embodiments.

Aspects of the Maldonado-Hicks airfoil 200 are illustrated in FIG. 2, along with associated pressure contours. The Maldonado-Hicks airfoil 200 can comprise a set of highly undercambered airfoils which adds a large degree of curvature to the under surface, as further detailed herein, designed for the use with underwing distributed ducted fans. As illustrated, the airfoil 200 can comprise a leading edge 205 profile with a curved nose 210, extending to an arced top surface 215. The curved nose 210 also extends to an undercambered lower surface 220. The arced top surface 215 and undercambered lower surface meet and terminate at the trailing edge 225, which can terminate in a point 230, where a boundary condition is applied such that the derivatives of the 5th order polynomial equations (1) that describe the top surface 215 and lower surface 220 are equal to each other and become tangential at point 230, or as close to a point as is practically possible given design and material constraints. This trailing edge point 230 can satisfy the Kutta condition, where the flow from the top surface 215 and undersurface 220 of the airfoil meet at point 230 and flow away from the airfoil 200.

In order to generate sufficient lift, the airfoils 200 can generally operate with a slight negative angle of attack 235. This allows the ducted fan arrays mounted in the aft region 240 to be partially hidden from front view. This airfoil 200 lends itself to a wing form factor, F where form drag is reduced, compared to approaches where ducted fans have their entire frontal cross section area exposed to the flow. The top 215, or suction pressure surface, and bottom 220 or pressure surface of the airfoil 200 can be represented with a continuous 5th order polynomial expression of the form provided in equation (1):

$$f(x/c) = a(x/c)^5 + b(x/c)^4 + c(x/c)^3 + d(x/c)^2 + e(x/c) \quad (1)$$

The smooth curvature 245 of the bottom surface 220 allows the pressure surface to act as a pre-inlet diffuser for the duct, reducing flow distortion into the inlet and fan interface. At an angle of attack, a of zero, the polynomial function can be parameterized to produce a slope of zero at a dimensionless chord distance, x/c=0.6, which is where the inlet of the ducted fan can be placed.

By way of example, an airfoil created with a camber of 7% and a thickness of 10% based on chord, c can be considered one possible embodiment of the disclosed system 100. Note, these dimensions are exemplary and other dimension can be used in other embodiments. In such an embodiment, aerodynamic lift and drag coefficients at a Reynolds number of $6.5\times10^6$ and Mach number of 0.22 can be considered. These flow parameters represent the cruise conditions of the mean aerodynamic wing chord for the eVTOL system 100.

This type of analysis illustrates the values of lift coefficient produced at certain angles of attack, and that the airfoil 200 can operate efficiently (with sufficiently high L/D) at low negative cruise angles of attack. Based on the analytical design lift coefficient calculated, CLd=0.47 for the fixed wing eVTOL system 100, and correction to the 2D airfoil design lift coefficient, Cld of approximately 0.7, the eVTOL concept can cruise at a negative angle of attack 235, αcr=−4 degrees.

Figure 3:
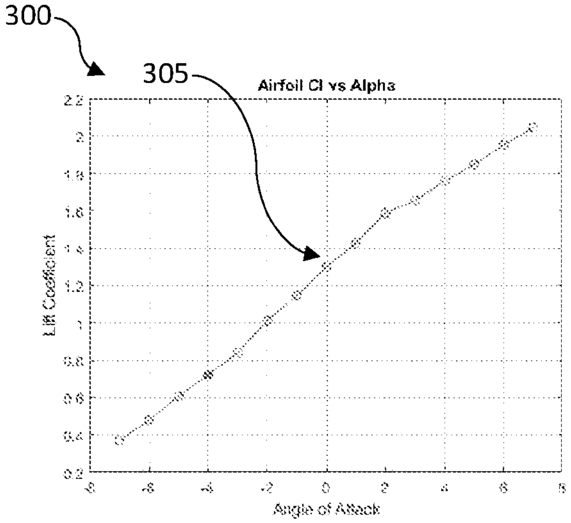
FIG. 3 depicts a chart of lift as a function of angle of attack, in accordance with the disclosed embodiments.
Figure 4:
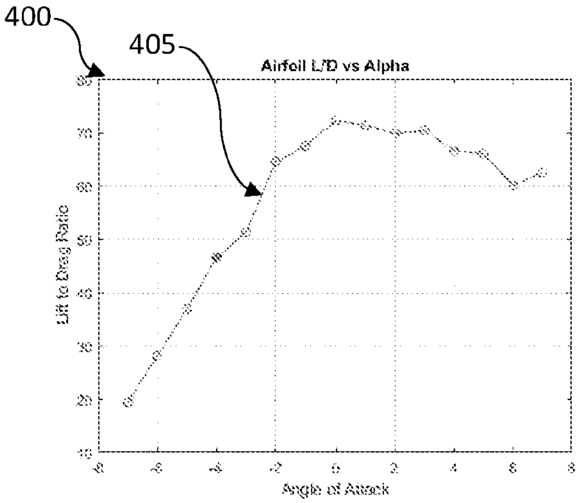
FIG. 4 depicts a chart of lift to drag ratio as a function of angle of attack, in accordance with the disclosed embodiments.
Figure 5:
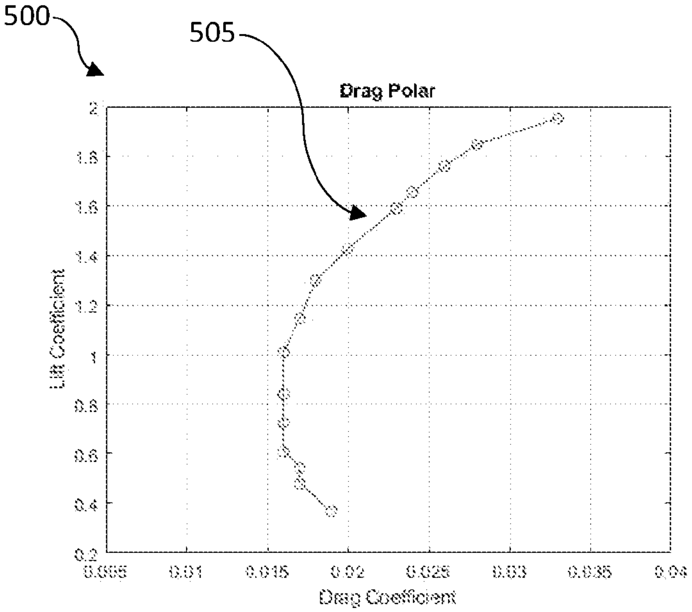
FIG. 5 depicts a chart of a lift as a function of a drag coefficient, in accordance with the disclosed embodiments.

The lift and drag coefficients of the airfoil 200 for angles of attack between-7 to 7 degrees are plotted as trace 305 in chart 300 of FIG. 3, trace 405 of chart 400 of FIG. 4, and trace 505 of chart 500 of FIG. 5. These charts show a fairly linear lift-curve-slope, Clα with a value of 0.12/deg which is fairly typical for 2D airfoil flows. The drag polar behavior is predictable and shows the airfoil 200 can achieve a base drag coefficient, Cd0 of 0.016 for small range of angles in the drag bucket from −5 to −2 degrees, which includes the cruise angle of attack. Finally, the plot of the L/D ratio on chart 400 of FIG. 4, indicates that the airfoil in cruise (in certain embodiments, this can be realized with α=−2 deg to −8 degrees) operates with L/D=47 which is considerably far from the optimum L/D peak of 72 at approximately α=0 deg. It is important to note that the airfoil could be operating more efficiently, however its orientation allows a ducted fan to be mounted underneath while minimizing additional form drag compared to an airfoil with a fully exposed fan.

An aspect of the disclosed embodiments is the integration of the ducted fans in a manner where the main wing airfoil (e.g., airfoil 200) and the ducted fan located in the aft region of the airfoil are blended as one assembly. This may be referred to as a "Fan-Foil" and is illustrated herein. This configuration offers certain aerodynamic advantages. Such advantages include, but are not limited to, partially "hiding" the ducted fan (when viewed in elevation from the front) thereby reducing the frontal profile area of the wing and reducing associated aerodynamic form factor and drag. Likewise, the underside of the airfoil can act as a diffusing pre-inlet for the fan reducing flow distortion on the rotor plane. The boundary layer developed on the underside of the airfoil is ingested by the fan inflow thereby minimizing viscous drag.

Figure 6A:
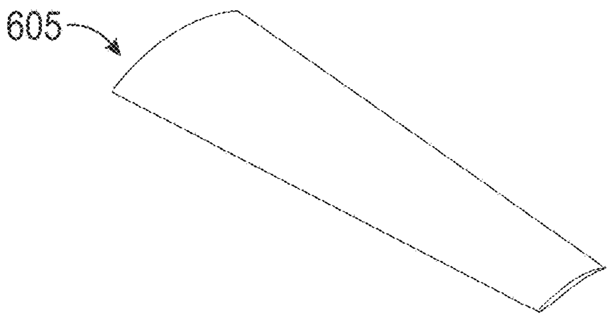
FIG. 6A depicts aspects of a half wing, in accordance with the disclosed embodiments.
Figure 6B:
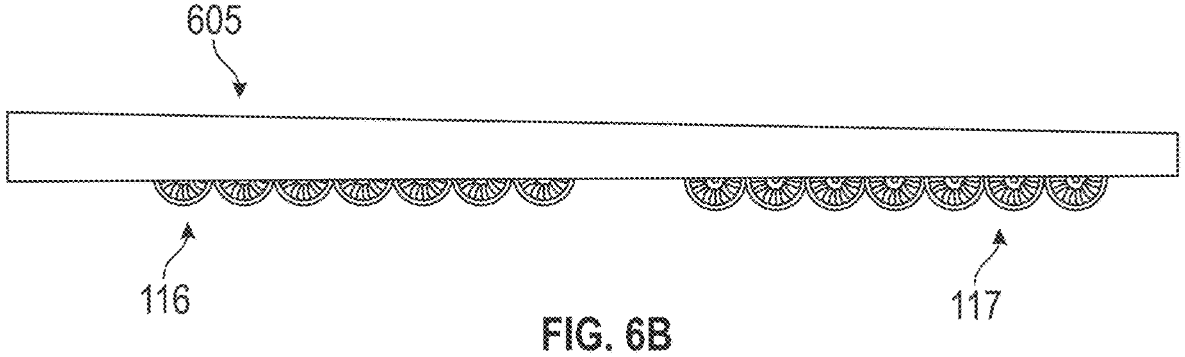
FIG. 6B depicts aspects of a fanfoil for an aircraft, in accordance with the disclosed embodiments.
Figure 6C:
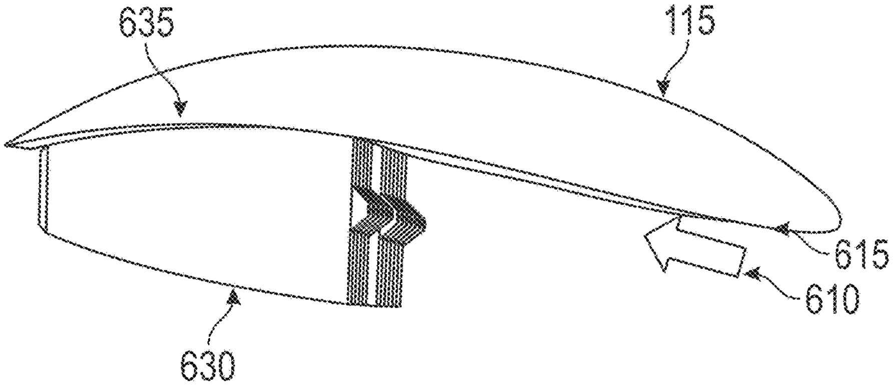
FIG. 6C depicts a side elevation view of a fanfoil, in accordance with the disclosed embodiments.
Figure 6D:
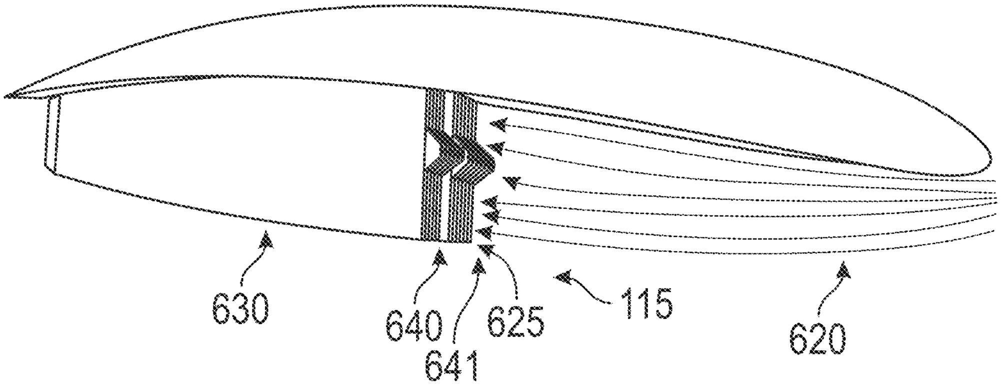
FIG. 6D depicts a side elevation view of a fanfoil with air flow lines, in accordance with the disclosed embodiments.

FIGS. 6A-6C illustrate aspects of an integrated or blended fan and airfoil. It should be appreciated that, in certain embodiments, the trailing edge region of the airfoil can be a flap structure with distributed fans as further detailed herein. This configuration can rotate in order to achieve thrust vectoring and flight transition on an aircraft.

FIG. 6A illustrates exemplary main wing geometry 605, which can serve as wing 115 or wing 120. FIG. 6B illustrates a front profile showing ducted fan arrays 116, 117, or ducted fan arrays 121, and 122 partially hidden underneath main wing 115 or main wing 120 respectively, to reduce the wing form factor.

FIG. 6C illustrates aspects of the relationship between the wing and ducted fan, presented from a side elevation view. At point 610 the undersurface 615 of the wing 115 (or wing 120) serves as a diffusing pre-inlet for the ducted fans 630 (e.g., an of ducted fan arrays 116, 117, or ducted fan arrays 121, and 122) located on the aft portion 635 of the wing 115. FIG. 6D further illustrates flow streamlines 620 or air, which show how flow expands and slows down due to the increase in area at the inlet 640 of the ducted fan 630.

Figure 6E:
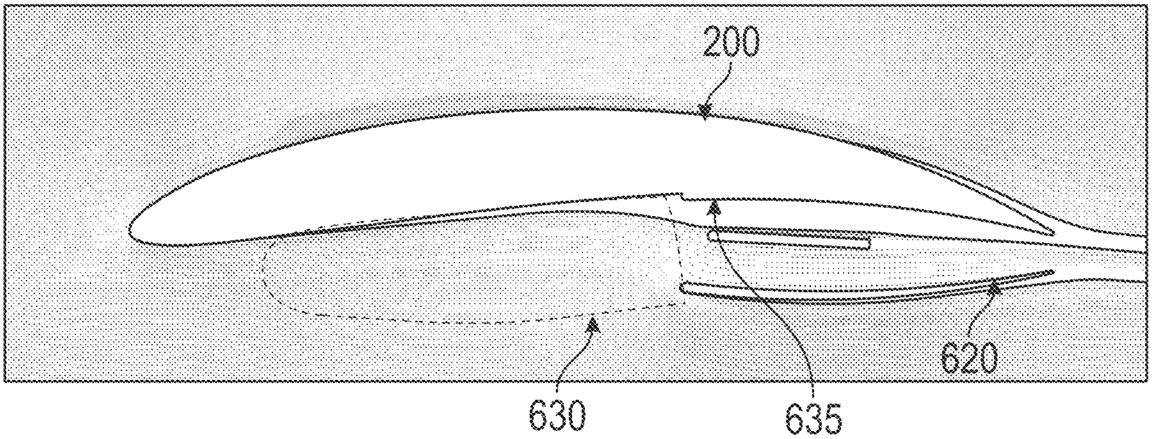
FIG. 6E depicts computational fluid dynamics of streamlines around the 'Maldonado-Hicks' airfoil with a ducted fan, in accordance with the disclosed embodiments.
Figure 6F:
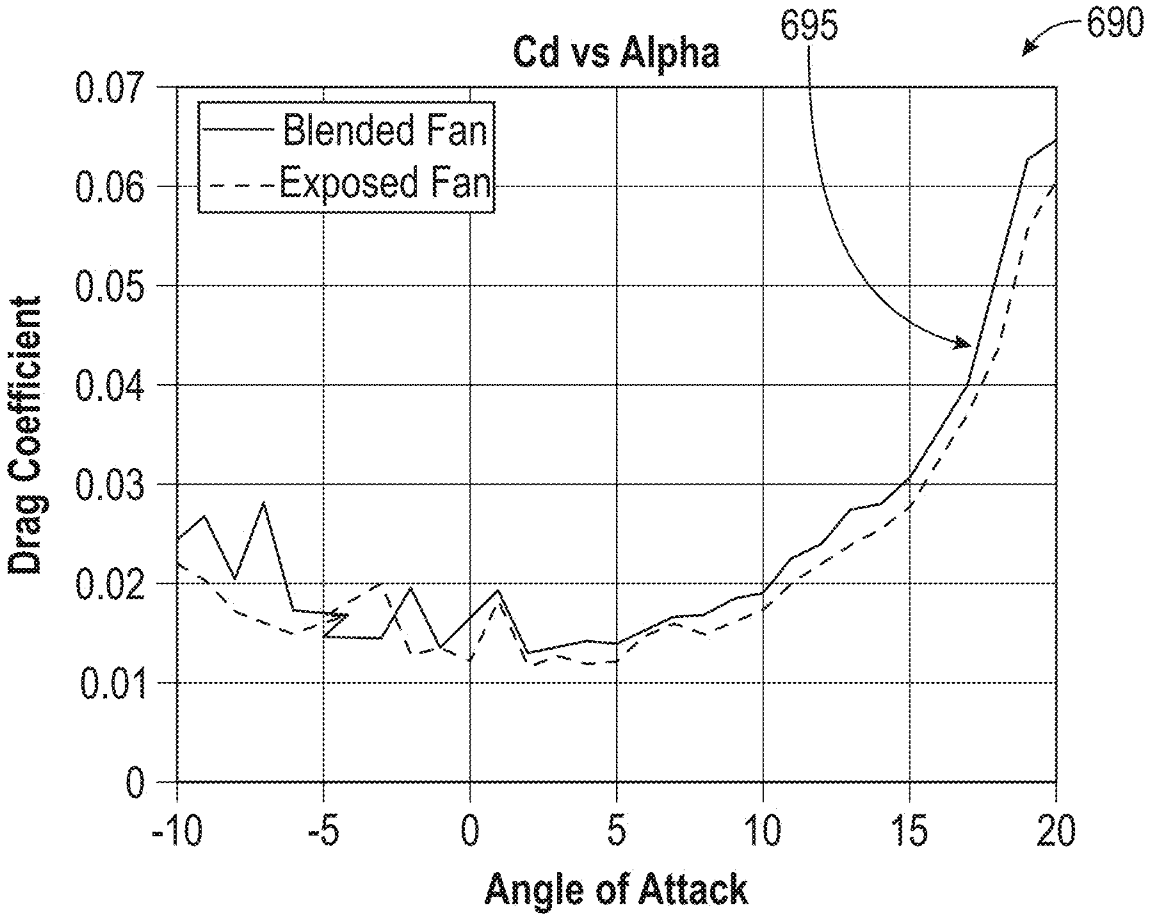
FIG. 6F depicts a chart with a CFD plot of drag coefficient as a function of angle of attack, in accordance with the disclosed embodiments.

FIG. 6E illustrates computational fluid dynamics (CFD) of the streamlines 620 around the 'Maldonado-Hicks' airfoil 200 with a ducted fan 630 blended into the airfoil underside 635. FIG. 6F provides a chart 690 with a CFD plot 695 of the drag coefficient as a function of angle of attack for the airfoil 200 with a fan 630 blended into the underside 635 compared to the same fan when it is fully exposed to the flow when viewing the airfoil and fan from the front. The results show the drag coefficient and thus drag force is lower for the blended fan for all angles of attack except for −2.5 to −4 degrees.

The airfoil profile 605 illustrated in FIGS. 6A-6E is a specially designed undercambered airfoil 200, referred to as a 'Maldonado-Hicks' airfoil. The airfoil has a high degree of undercamber, (a maximum of 8% based on chord which allows the wing to partially hide the ducted fans and operate in cruise at a negative angle of attack), and a of approximately −2 to −8 degrees while producing the required lift. This slight pitch-down orientation significantly 'hides' the fans from a frontal view perspective, reducing the cross section area and the aerodynamic form factor. The upper surface and undersurface of the airfoil 200 is approximated with the 5th order polynomial of equation (1), creating a pre-inlet 641 with smooth flow expansion to condition the flow into the duct inlet 640 located at x/c=0.6 based on chord, where x/c=0 is the leading edge of the airfoil.

Figure 7:
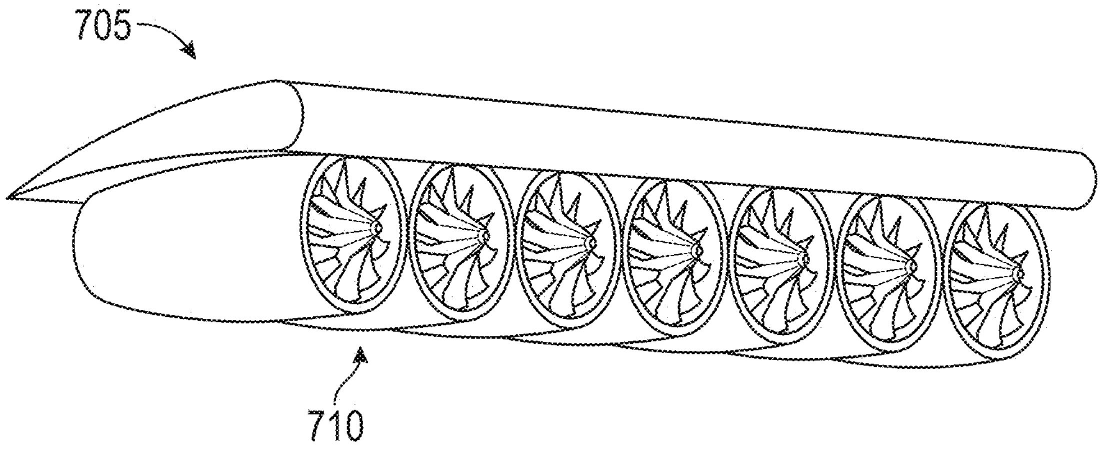
FIG. 7 depicts a wing flap of an aircraft, in accordance with the disclosed embodiments.

FIG. 7 provides an exemplary illustration of a fan flap 705. In certain embodiments, the fan flap 705 can be a part of the wing 115 or wing 120, used to allow thrust vectoring for flight transition as well as for primary flight control in maneuvering. To that end, the fan flap 705 can articulate to redirect the orientation of the fan flap 705.

In exemplary embodiments, the flap 705 can be integrated as the rear 40% section of the airfoil 200 with ducted fans 710 (e.g., ducted fan arrays 116, 117, and 118, and ducted fan arrays 121, 122, 123). In other embodiments, a range of flap integration can be anywhere to 20% to 60% section of the airfoil 200 depending on design considerations. During flight transition, the flap extends a short distance away from the main wing to allow the flap and ducted fans to rotate freely with a range of motion of 90 degrees. Linkage can be provided in the wing 115 or wing 120, to extend flap 705 outwards along supports. The flap 705 can then rotate about an axel configured to connect to the wings and the flaps.

The array of adjacent fans can thus be mounted to the flap 705 structure, which is affixed to the main wing 115 or wing 120, with a mechanism that allows the flap 720 to rotate to enable major flight transition and finer flight control. Approximately 50% or more of the frontal area of the ducted fans 720 can be eliminated using this method.

This type of ducted fan engine and wing airfoil arrangement will substantially reduce the aerodynamic form factor of the wing compared to an arrangement where the engines are fully exposed to the airflow underneath or above the wing. Therefore, the FanFoil 200 offers a wing with a higher overall L/D in cruise conditions.

FIGS. 8A-8E illustrate aspects of the rotatable ducted fans integrated into an airfoil in accordance with the disclosed embodiments. The rotation of the ducted fans allows the system 100 to operate with vertical takeoff and landing capability along with streamlined and efficient flight between takeoff and landing.

Figure 8A:
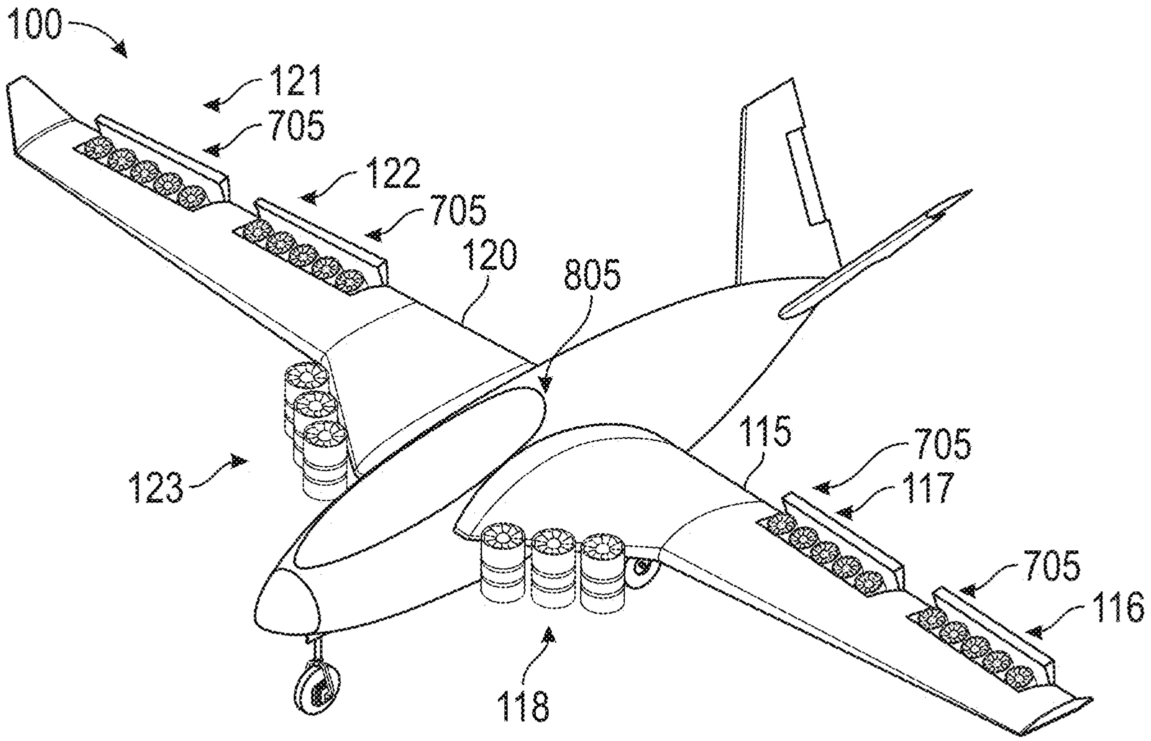
FIG. 8A depicts a first step in a progression of orientation ducted fans on an aircraft, in accordance with the disclosed embodiments.

As illustrated in FIG. 8A, the ducted fan arrays can begin in a vertical, or nearly vertical orientation, to facilitate takeoff such as vertical takeoff. This is achieved by orienting flaps 705 on each of wings 115 and 120, with ducted fan arrays 116 and 117 and ducted fan arrays 120 and 121 respectively such that the ducted fan arrays are substantially vertically oriented and configured to direct air downwards (e.g., with inlets pointed upward).

Likewise, the large, ducted fans 118 and 123 respectively can be moved along a moving track configured inside and on the undersurface of the wings 115 and 120 respectively. In this embodiment, the large, ducted fans 118 and 123 which are mounted to the track are able to translate and rotate according to the curvature of the under surface 220 of the airfoil 200 from a vertical position at the leading edge 210, to a horizontal position at the trailing edge 230 for forward flight.

The large, ducted fans 118 and 123 respectively can provide 100% thrust in the vertical direction to hover, and can provide 100% thrust in the horizontal direction for forward flight. The aircraft 100 is stable during hover and transition because the center of gravity 805 lies in between the large, ducted fans 118 and 123, and rear ducted fan arrays.

Figure 8B:
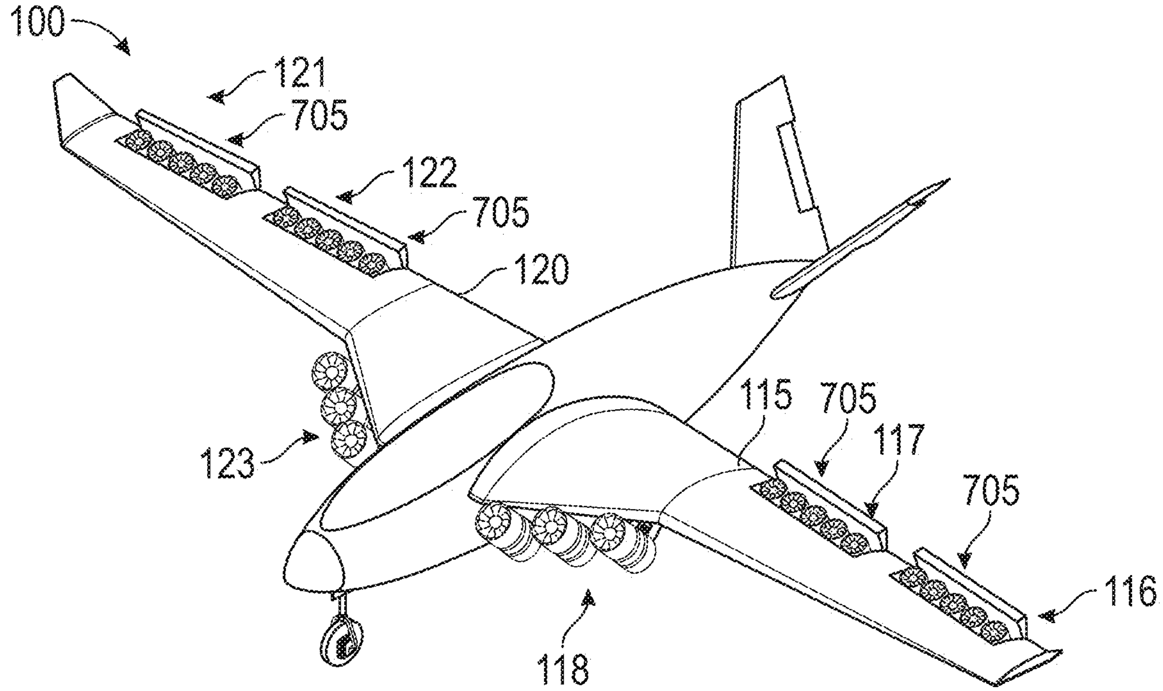
FIG. 8B depicts a second step in a progression of orientation ducted fans on an aircraft, in accordance with the disclosed embodiments.

As illustrated in FIG. 8B, the large, ducted fan arrays 118 and 123 begin to slide back along the wing, towards to the rear of the wing using a mechanical linkage/rail system. The fans on the flaps (e.g., 116, 117, 121, and 122) begin to rotate using a geared motor drive on the flap 705. The thrust is vectored, for example, to 75% vertical thrust, and 25% horizontal thrust in order to slowly accelerate the aircraft 100 for forward flight. The fans remain in this position until the aircraft 100 stall speed is reached, before proceeding to the next transition position.

Figure 8C:
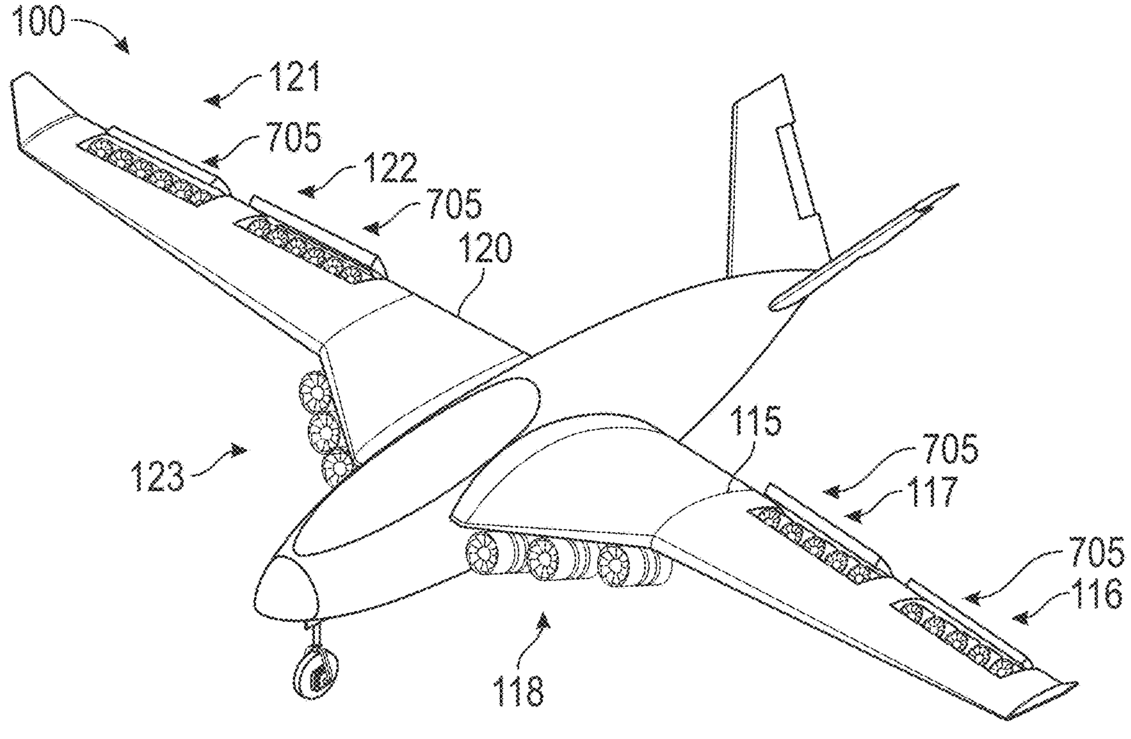
FIG. 8C depicts a third step in a progression of orientation ducted fans on an aircraft, in accordance with the disclosed embodiments.

In FIG. 8C, the aircraft is illustrated after the next transition has been reached. Here, once the stall speed is reached and the wings 115 and 120 are producing sufficient lift, the large fans 118 and 123 continue to slide back, and the flap 705 fans 116, 117, 121, and 122 continue to rotate. In this 50% transition position, the thrust is vectored so that the vertical and horizontal thrust is produced equally (50% thrust each). Note the fan positions illustrated in FIGS. 8C-8E can occur relatively quickly as compared to the progression through FIGS. 8A-8C, since at this stage the wing is creating the vast majority of the lift.

Figure 8D:
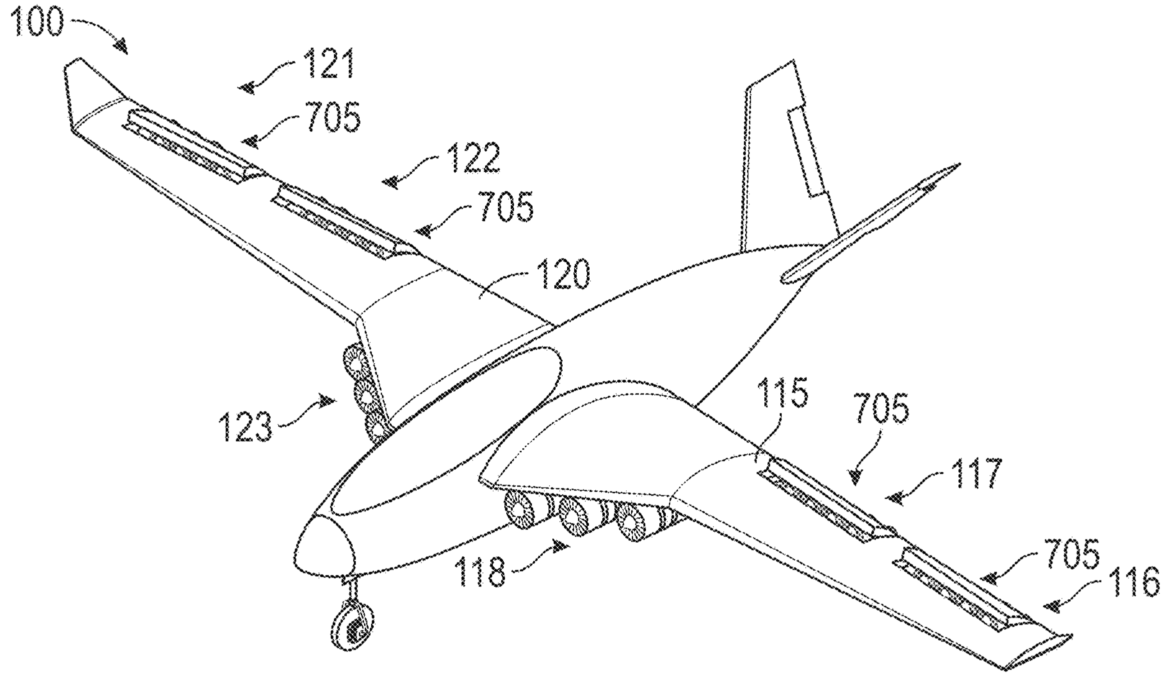
FIG. 8D depicts a fourth step in a progression of orientation ducted fans on an aircraft, in accordance with the disclosed embodiments.

In FIG. 8D, the ducted fans, 116, 117, 121, and 122 on flaps 705 have rotated 80%, such that most of the thrust (~80%) is in the horizontal direction. The aircraft 100 continues to accelerate forward towards the climb speed. Likewise, large, ducted fans 118 and 123 have traveled into a substantially parallel position with the underside of the wings 115 and 120 respectively, although they have not yet reached their terminal position at the aft portion of the wings 115 and 120.

Figure 8E:
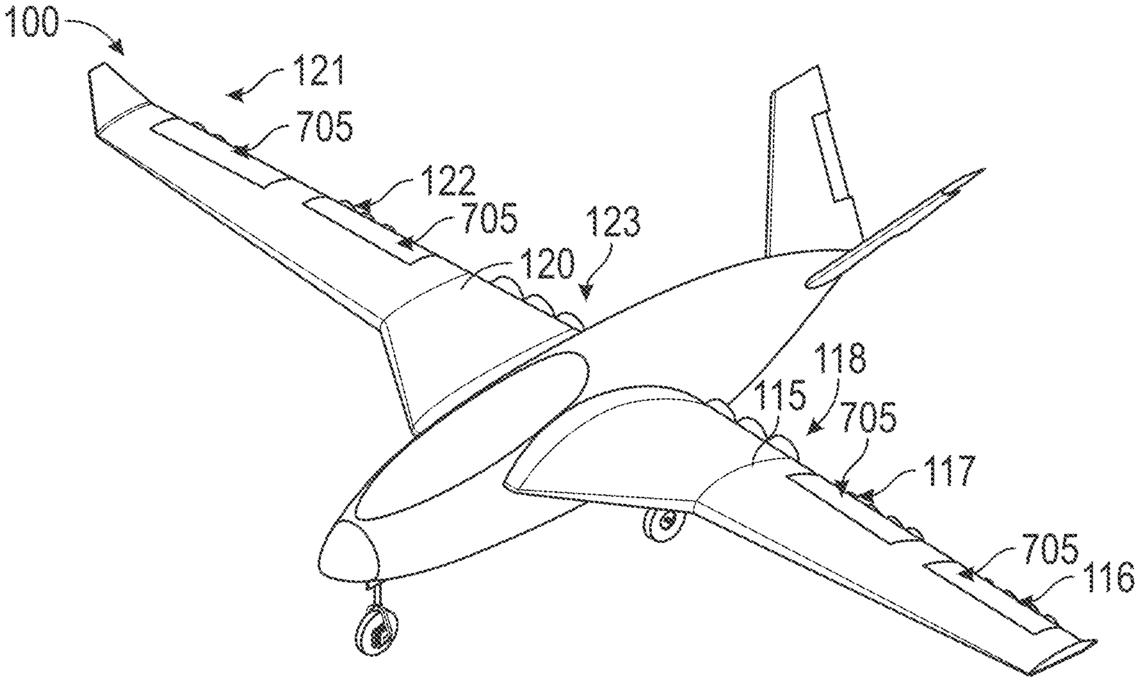
FIG. 8E depicts a fifth step in a progression of orientation ducted fans on an aircraft, in accordance with the disclosed embodiments.

Finally, in FIG. 8E, the large, ducted fans 118 and 123 slide all the way back to the wing's 115 and 120, respective trailing edges to finish the transition sequence and are now at the 100% final position for standard flight. The flap 705 fans 116, 117, 121, and 122 also rotate fully, such that all thrust is vectored for forward flight. In this fan position, the aircraft can climb or cruise (steady flight) once the velocity for each has been reached. It should be understood that this progression is provided for exemplary purposes, and other thrust and vectoring metrics may be used in other embodiments.

Figure 9A:
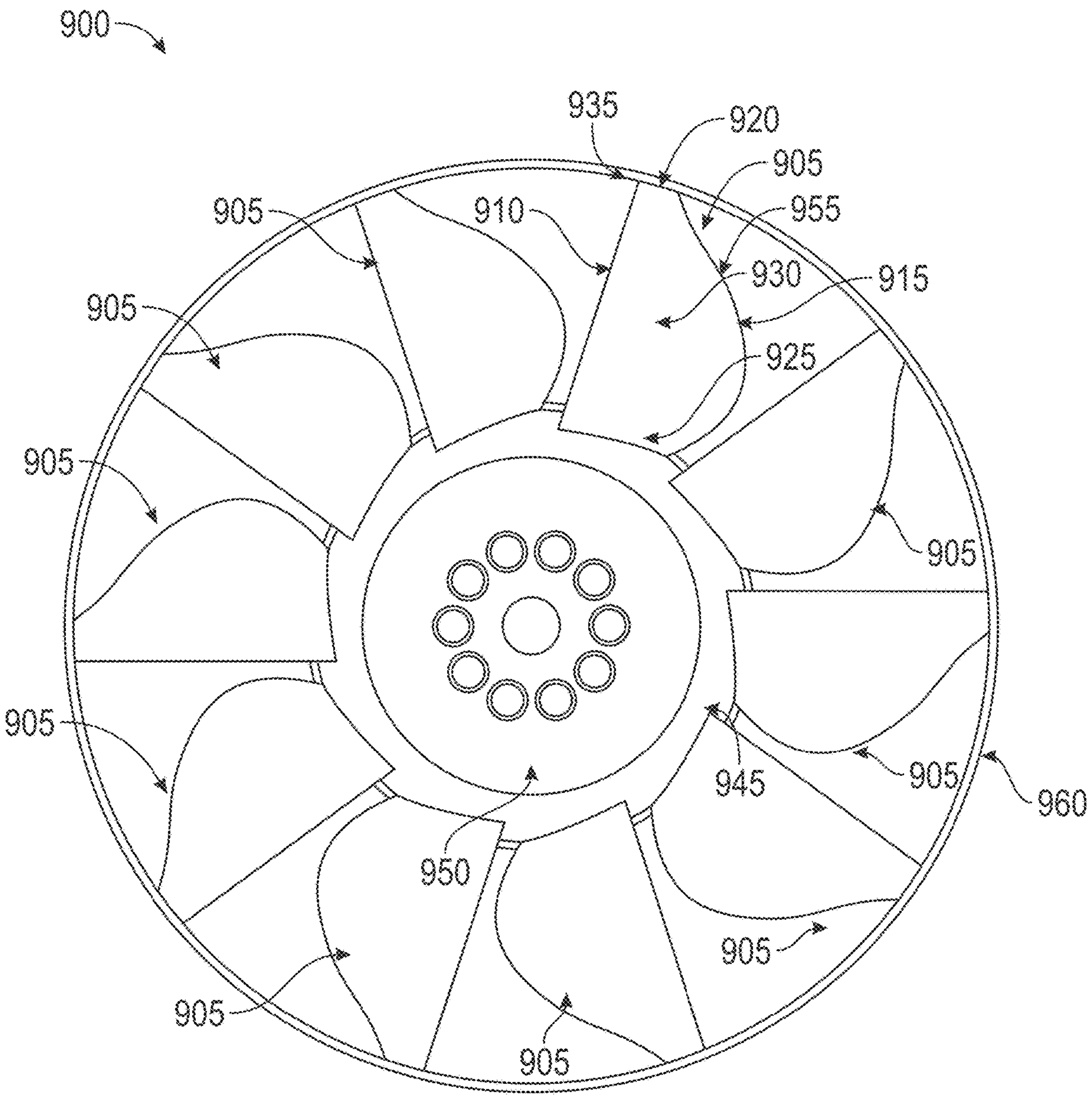
FIG. 9A depicts a ducted fan with elliptical rotor blades, in accordance with the disclosed embodiments.
Figure 9B:
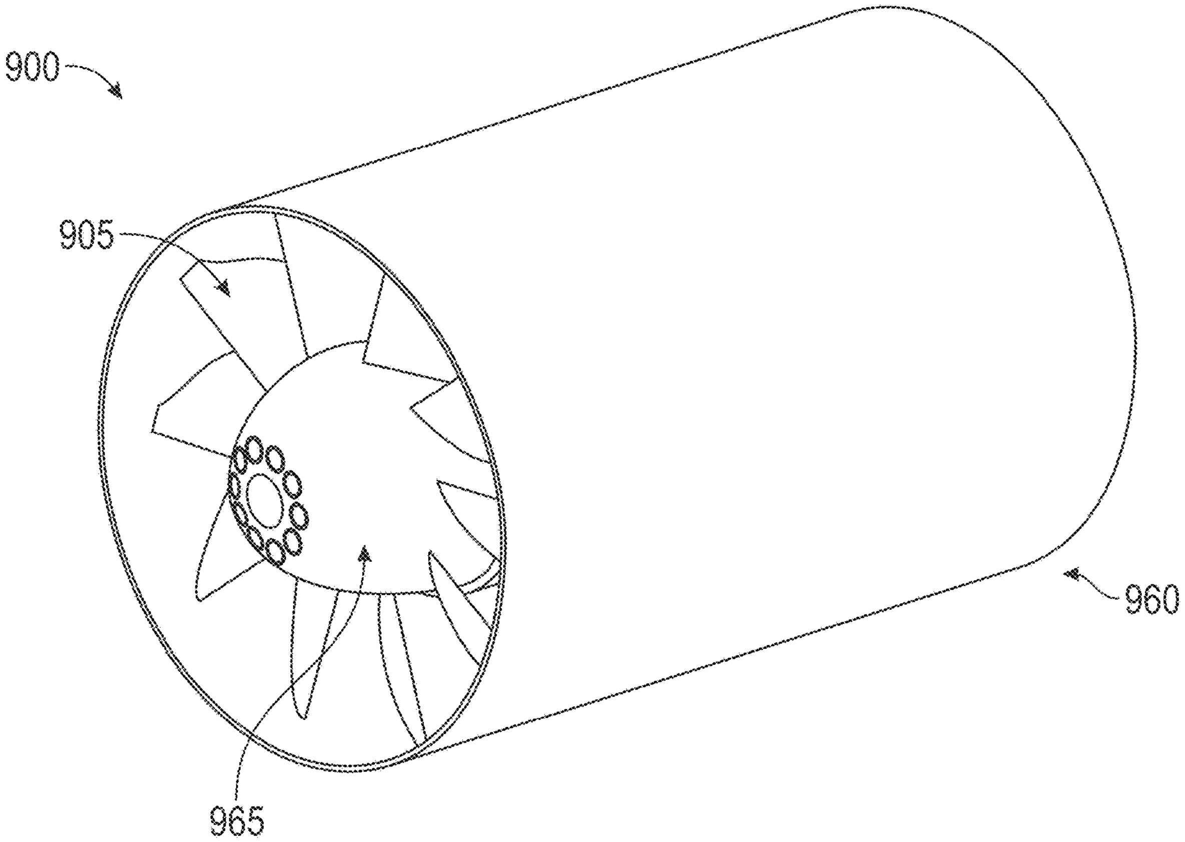
FIG. 9B depicts an isometric view of a ducted fan with elliptical rotor blades, in accordance with the disclosed embodiments.
Figure 9C:
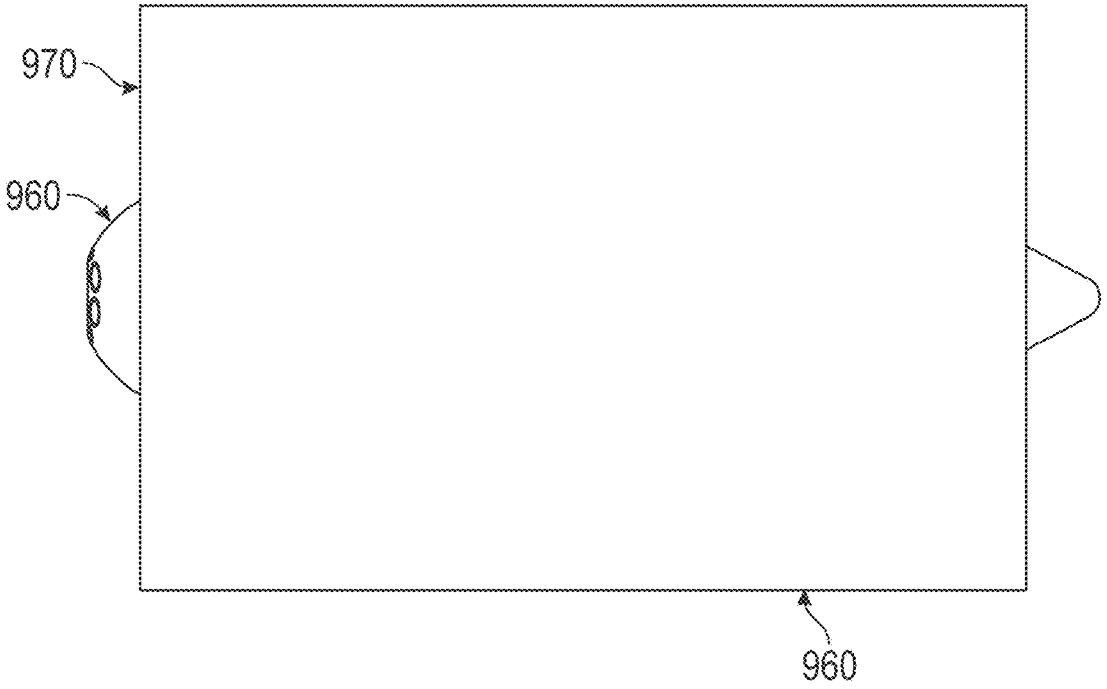
FIG. 9C depicts a side elevation view of a ducted fan with elliptical rotor blades, in accordance with the disclosed embodiments.

Another aspect of the disclosed embodiments includes improved ducted fan engines 900, for propulsion applications in electric aircraft as illustrated in FIG. 9A-9C. The improved ducted fan can include multiple rotor blades 905.

An aspect of this improvement includes an elliptical blade design for rotor blades 905, which has low blade tip vortex shedding and results in low drag and noise. The rotor blade 905 can have a zero-sweep leading edge 910 and an elliptical trailing edge 915 to gradually reduce the chord at the blade tip 920, such that lift production, per unit span, is redistributed to behave in a more efficient 'elliptical' manner. Thus, more blade lift and rotor thrust will be produced in the blade root 925 and middle regions 930 by increasing the local blade chord, and vastly reducing the chord near the blade tip 920 to reduce lift per-unit span and rotor thrust. The elliptical shaped trailing edge is designed using the functions of ellipses with varying values of a, b, and thus eccentricity as shown in equation (2):

$$\frac{x^2}{a^2} + \frac{y^2}{b^2} = 1 \quad (2)$$

Assuming a≥b, where the foci are at (±c, 0) for $c=\sqrt{a^2-b^2}$ Where the eccentricity is given by equation (3) as:

$$e = \frac{c}{a} = \sqrt{1 - \frac{b^2}{a^2}} \quad (3)$$

In the root area 925 of the blade, the trailing edge 915 curvature is given by an ellipse with low eccentricity (close to that of a circle, where e=0), while the middle and outboard region of the blade trailing edge 915 is described by ellipses with e=0.5 to <1.0.

The disclosed design reduces the blade forces at the blade tip 920, and the pressure gradient driven flow through the blade-duct gap 935. This can reduce or eliminate the high frequency 'whistling' noise characteristic of propulsive ducted fans.

The rotor design variables include the blade chord distribution 940 on the hub 945 as well as general shaping, the blade root 925 pitch angle 950, the pitch distribution, and the airfoil thickness. The goal is to produce a rotor with blade design variables to maximize thrust while minimizing power. This is accomplished with blades 905 that have a relatively low airfoil thickness to chord ratio, t/c of approximately 6-8% to reduce form drag, and employ what is referred to as an ideal pitch distribution, θ(r/R) given by equation (4):

$$\theta(r/R) = \frac{\theta_{tip}}{r/R} \quad (4)$$

Where $\theta_{tip}$ is the blade pitch angle at the tip 920 of the blade 905, and r/R is the dimensionless rotor radius, which varies from approximately 0.25 to 0.3 at the blade root 925, to 1.0 at the blade tip 920.

It should be appreciated that some or all of the ducted fans 116, 117, 118, 121, 122, and 123 can be configured according as the ducted fan engine 900.

The ducted fan engine 900 can be powered by a brushless motor at its core and driven by power supplied from a battery. Unique to the rotor and duct design are key elements that improve the engine's 'figure of merit,' F M while reducing acoustic noise produced by the rotor, and increasing the overall cruise lift-to-drag ratio, L/D of an aircraft when multiple engines are distributed on the underside of a specially designed undercambered wing which takes advantage of the 'Maldonado-Hicks' airfoil 200.

The rotor design will benefit aircraft, in particular electric vertical takeoff and landing vehicles or eVTOLs, which are envisioned to operate in urban areas where noise is an issue. The rotor blades 905 are optimally shaped with an elliptical planform 955 along the trailing edge 915. A skilled artisan will appreciate that these changes to the planform shape can result in major differences in performance. The elliptical planform 955 approximates an elliptical lift per-unit span distribution, which reduces induced drag and improves aerodynamic efficiency. Lower operating noise will be produced from the blade 905 which has a shorter chord length and area per-unit span at the blade tip 920 due to less air flux and vortex shedding through the sub-millimeter gap between the blade tip 920 and duct 960.

FIG. 9B illustrates an isometric view of the ducted fan 900. In this view, the duct 960 is illustrated around the fan rotor blades 905. The blades 905 can be connected to hub 945 which includes nose cone 965. The hub 945 can be connected to a rotor shaft that is driven by an electric motor. As illustrated in FIG. 9C, the nose cone 965 can extend beyond the forward edge 970 of the duct 960.

Thus, the main elements of the electric ducted fan engine include: (i) the ducted fan rotor with elliptical planform blades which are designed to blend into the aft portion of the 'Maldonado-Hicks' airfoil 200, introduced above and referred to as the 'FanFoil'. Associated performance variables include ducted fan thrust, power, and flow variables initially comprising mean exit jet velocity and Mach number.

The rotors disclosed herein must be safe and efficient at operating rotor speeds from 5,000 up to approximately 35,000 RPM. Plots of the figure of merit, F M as a function of the thrust coefficient, $C_T$ according to the equations below, can be produced for the disclosed rotor blade. The F M is defined as the ideal power required to produce thrust, derived from actuator disk theory, relative to the actual measured power required to produce thrust as given by equations (5):

$$FM = \frac{P_{ideal}}{P_{actual}} = \frac{\frac{T\,3/2}{\sqrt{2pA}}}{P_{elec}} \quad (5)$$

where ideal power contains air density, p and rotor disk area, A. The measured power is the electric power supplied to the motor to drive the rotor and generate thrust. The thrust coefficient is also a dimensionless parameter that quantifies the potential of a rotor to generate thrust relative to its disk area and blade tip velocity, (OR), as illustrated by equation (6):

$$C_T = \frac{T}{\rho A\,(\Omega R)^2} \quad (6)$$

Computing these parameters confirms the design disclosed herein improves the aerodynamic performance of the ducted fan. Overall pressure levels ($L_p$) can also be calculated to allow comparison among rotor designs as given by equation (7):

$$L_P = 10\log\frac{\frac{2}{rns}}{p^2} \quad (7)$$

The embodiments presented herein are thus direct to propulsive ducted fan rotors These rotors include elliptical planform blades which are aerodynamically superior, and increase the figure of merit while reducing the noise produced by the rotor at high operating speeds. The rotor can be applied as a FanFoil duct that is blended into a wing section of an aircraft.

It should be appreciated that the blade design described herein may be advantageously used in other fields as well, including but not limited to, HVAC fans and applications, underwater propulsion, fluidic applications, or the like.

Based on the foregoing, it can be appreciated that a number of embodiments, preferred and alternative, are disclosed herein. In an embodiment, a flying system comprises a fuselage, at least one wing mounted to the fuselage, the wing comprising an undercambered lower surface, and at least one array of ducted fans mounted to the undercambered lower surface of the at least one wing.

In an embodiment, the at least one wing further comprises two wings. In an embodiment, the at least one wing further comprises an airfoil comprising a Maldonado Hicks airfoil.

In an embodiment, the at least one array of ducted fans further comprises an inner ducted fan array configured nearer to the fuselage and an outer ducted fan array configured nearer to the at least one wing's tip.

In an embodiment, the flying system further comprises a wing flap, wherein the at least one array of ducted fans is mounted on the wing flap. In an embodiment, the wing flap is configured to rotate the orientation of the array of ducted fans 90 degrees from a substantially horizontal position to a substantially vertical position.

In an embodiment, the at least one array of ducted fans is mounted on an aft region of the at least one wing. In an embodiment, the at least one array of ducted fans further comprises a larger ducted fan array. In an embodiment, the flying system further comprises a linkage configured in the at least one wing, the linkage configured to move the larger ducted fan array from the front of the at least one wing to the aft of the at least one wing. In an embodiment, the larger ducted fan array is configured to be in a substantially vertical orientation in the front of the at least one wing, and a substantially horizontal orientation at the aft of the at least one wing.

In an embodiment, the flying system further comprises a rotor blade associated with at least one fan in the ducted fan array, the rotor blade comprising a zero sweep leading edge and an elliptical trailing edge.

In another embodiment, a system comprises a fuselage, two wings mounted to the fuselage, and at least one ducted fan mounted to the at least one wing, the ducted fan comprising: a duct and a plurality of rotor blades, each of the plurality of rotor blades comprising: a zero sweep leading edge and an elliptical trailing edge. In an embodiment, each of the plurality of rotor blades further comprise a flat tip in spaced relation with the duct. In an embodiment, each of the plurality of rotor blades further comprises a blade root attached to a hub, where in the pitch angle of each of the plurality of blades is defined by the pitch angle of the blade root on the hub.

In an embodiment, each of the two wings further comprise an undercambered lower surface. In an embodiment, each of the two wing further comprises an airfoil comprising a Maldonado-Hicks airfoil.

In an embodiment the system further comprises a wing flap, wherein the ducted fan is mounted on the wing flap. In an embodiment, the wing flap is configured to rotate the orientation of the ducted fan 90 degrees from a substantially horizontal position to a substantially vertical position.

In an embodiment, the ducted fan comprises an array of ducted fans, the array of ducted fans further comprising: a larger ducted fan array, an outer ducted fan array configured nearer to the at least one wing tip, and an inner ducted fan array configured between the larger ducted fan array and the outer ducted fan array.

In another embodiment an eVTOL aircraft comprises a fuselage, two wings mounted to the fuselage, the wings comprising an undercambered lower surface, an array of ducted fans mounted to the undercambered lower surface of each of the two wings, wherein each fan in the array of ducted fans comprises: a duct and a plurality of rotor blades, each of the plurality of rotor blades comprising: a zero sweep leading edge and an elliptical trailing edge.

It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A flying system comprising:

a fuselage;

at least one wing mounted to the fuselage, the at least one wing having a Maldonado hicks airfoil comprising an undercambered lower surface; and at least one array of ducted fans mounted to the undercambered lower surface of the at least one wing, wherein the at least one array of ducted fans is in a substantially horizontal position below the undercambered lower surface of the at least one wing.

2. The flying system of claim 1 wherein the at least one wing further comprises two wings.

3. The flying system of claim 1 wherein the at least one array of ducted fans further comprises:

an inner ducted fan array configured nearer to the fuselage; and an outer ducted fan array configured nearer to a wing tip.

4. The flying system of claim 1 further comprising:

a wing flap, wherein the at least one array of ducted fans is mounted on the wing flap.

5. The flying system of claim 4 wherein the wing flap is configured to rotate an orientation of the at least one array of ducted fans 90 degrees from the substantially horizontal position to a substantially vertical position.

6. The flying system of claim 1 wherein the at least one array of ducted fans is mounted on an aft region of the at least one wing.

7. The flying system of claim 3 wherein the inner ducted fan array configured nearer to the fuselage is larger than the outer ducted fan array configured nearer to the wing tip.

8. The flying system of claim 7, further comprising:

a linkage configured in the at least one wing, the linkage configured to move the inner ducted fan array from a front of the at least one wing to an aft of the at least one wing.

9. The flying system of claim 8 wherein the inner ducted fan array is configured to be in a substantially vertical orientation in the front of the at least one wing, and the substantially horizontal orientation at the aft of the at least one wing.

10. The flying system of claim 1 further comprising:

a rotor blade associated with at least one fan in the ducted fan array, the rotor blade comprising:

a zero sweep leading edge; and an elliptical trailing edge.

11. A system comprising:

a fuselage;

two wings mounted to the fuselage, wherein each of the two wings have an airfoil comprising a Maldonado hicks airfoil; and at least one ducted fan mounted to at least one of the two wings, the at least one ducted fan comprising:

a duct; and a plurality of rotor blades, each of the plurality of rotor blades comprising:

a zero sweep leading edge; and an elliptical trailing edge wherein each of the plurality of rotor blades has a shorter chord length and area per-unit span at a blade tip than at a blade root.

12. The system of claim 11 wherein each of the plurality of rotor blades further comprises:

a flat tip in spaced relation with the duct.

13. The system of claim 11 wherein each of the blade roots of the plurality of rotor blades is attached to a hub, wherein a pitch angle of each of the plurality of rotor blades is defined by a pitch angle of the blade root on the hub.

14. The system of claim 11 further comprising:

a wing flap, wherein the at least one ducted fan is mounted on the wing flap.

15. The system of claim 14 wherein the wing flap is configured to rotate an orientation of the at least one ducted fan 90 degrees from a substantially horizontal position to a substantially vertical position.

16. The system of claim 11 wherein the at least one ducted fan comprises an array of ducted fans, the array of ducted fans further comprising:

a first ducted fan array that is larger than an outer ducted fan array configured nearer to a wing tip; and an inner ducted fan array configured between the first ducted fan array and the outer ducted fan array.

17. An electric vertical takeoff and landing (eVTOL) aircraft comprising:

a fuselage;

two wings mounted to the fuselage, wherein each of the two wings comprises a Maldonado hicks airfoil having an undercambered lower surface;

an array of ducted fans mounted to the undercambered lower surface of each of the two wings wherein the array of ducted fans is in a substantially horizontal position below the undercambered lower surface of each of the two wings, wherein each fan in the array of ducted fans comprises:

a duct; and a plurality of rotor blades, each of the plurality of rotor blades comprising:

a zero sweep leading edge; and an elliptical trailing edge.

* * * * *